United States Patent
Iyer

(10) Patent No.: US 9,654,718 B2
(45) Date of Patent: May 16, 2017

(54) METHOD AND APPARATUS FOR SELECTING A SIGNAL SOURCE

(75) Inventor: Suraj C. Iyer, Bolton, MA (US)

(73) Assignee: Bose Corporation, Framingham, MA (US)

( * ) Notice: Subject to any disclaimer, the term of this patent is extended or adjusted under 35 U.S.C. 154(b) by 1894 days.

(21) Appl. No.: 12/061,410

(22) Filed: Apr. 2, 2008

(65) Prior Publication Data

US 2009/0251604 A1   Oct. 8, 2009

(51) Int. Cl.
*H04N 3/27* (2006.01)
*H04N 5/44* (2011.01)
*H04N 5/04* (2006.01)
*H04N 5/775* (2006.01)
*H04N 5/268* (2006.01)
*H04N 5/60* (2006.01)

(52) U.S. Cl.
CPC ............... *H04N 5/44* (2013.01); *H04N 5/04* (2013.01); *H04N 5/268* (2013.01); *H04N 5/60* (2013.01); *H04N 5/775* (2013.01)

(58) Field of Classification Search
CPC .. H04N 5/44; H04N 5/60; H04N 5/04; H04N 5/775; H04N 5/268; H04N 21/43634; H04R 2420/01; H04R 5/04; H01N 21/235; H01N 21/435; H01N 21/84; H01N 21/443
USPC .................. 381/80, 81, 85; 348/554, 725
See application file for complete search history.

(56) References Cited

U.S. PATENT DOCUMENTS

| | | | | |
|---|---|---|---|---|
| 3,922,641 | A * | 11/1975 | Gates, Jr. | 340/2.7 |
| 4,996,597 | A * | 2/1991 | Duffield | 348/705 |
| 5,291,343 | A | 3/1994 | Goto et al. | |
| 5,303,063 | A | 4/1994 | Kim et al. | |
| 5,600,382 | A * | 2/1997 | Won | 348/705 |
| 5,646,699 | A * | 7/1997 | Oh | G10H 1/361 |
| | | | | 348/553 |
| 5,673,088 | A * | 9/1997 | Nah | 348/555 |
| 5,754,256 | A * | 5/1998 | Kim | H04B 1/205 |
| | | | | 348/706 |
| 6,026,168 | A * | 2/2000 | Li et al. | 381/28 |
| 6,034,737 | A * | 3/2000 | Koyama | H04N 5/60 |
| | | | | 348/552 |
| 6,052,471 | A * | 4/2000 | Van Ryzin | 381/85 |
| 6,167,139 | A * | 12/2000 | Kim | H04N 5/44513 |
| | | | | 348/E5.102 |
| 6,473,135 | B1 * | 10/2002 | Iwamura | 348/706 |
| 6,529,680 | B1 * | 3/2003 | Broberg | 386/200 |
| 7,027,981 | B2 * | 4/2006 | Bizjak | 704/225 |
| 7,043,691 | B1 * | 5/2006 | Kwon et al. | 715/705 |
| 7,131,135 | B1 | 10/2006 | Virag et al. | |
| 7,158,643 | B2 * | 1/2007 | Lavoie et al. | 381/58 |
| 7,162,733 | B2 * | 1/2007 | Kamieniecki | 725/133 |
| 7,212,253 | B1 * | 5/2007 | de Groot | H04N 5/607 |
| | | | | 348/553 |

(Continued)

FOREIGN PATENT DOCUMENTS

WO         9929045         6/1999

*Primary Examiner* — Thinh T Nguyen
(74) *Attorney, Agent, or Firm* — Brian M. Dingman; Dingman IP Law, PC

(57) ABSTRACT

A method of selecting a signal input includes the steps of transmitting an audio signal to an audio input of a device that includes a plurality of audio inputs. A setting of the device is automatically advanced from a currently set audio input to another one of the audio inputs when the device does not output a signal associated with said audio signal.

12 Claims, 4 Drawing Sheets

(56) References Cited

U.S. PATENT DOCUMENTS

| | | | |
|---|---|---|---|
| 7,797,718 B2* | 9/2010 | Stecyk et al. | 725/80 |
| 7,911,542 B2* | 3/2011 | Kim et al. | 348/706 |
| 7,970,155 B2* | 6/2011 | Asayama | H04N 5/60 |
| | | | 381/123 |
| 7,982,803 B2* | 7/2011 | Lee | 348/515 |
| 8,233,029 B2* | 7/2012 | Yoshida | G11B 31/006 |
| | | | 348/14.11 |
| 2001/0038702 A1* | 11/2001 | Lavoie et al. | 381/307 |
| 2002/0016973 A1 | 2/2002 | Matsushita et al. | |
| 2002/0141732 A1* | 10/2002 | Reese | H04N 5/765 |
| | | | 386/223 |
| 2003/0066080 A1* | 4/2003 | Kamieniecki | 725/80 |
| 2003/0179100 A1* | 9/2003 | Zustak | G08C 19/28 |
| | | | 340/12.26 |
| 2005/0154766 A1* | 7/2005 | Huang et al. | 707/104.1 |
| 2006/0221254 A1* | 10/2006 | Chang | 348/706 |
| 2006/0236359 A1* | 10/2006 | Lee | 725/133 |
| 2007/0022464 A1* | 1/2007 | Dean | G11B 27/10 |
| | | | 725/136 |
| 2007/0274684 A1* | 11/2007 | Yoshida | G11B 31/006 |
| | | | 386/230 |
| 2008/0094524 A1* | 4/2008 | Schobben | 348/738 |

* cited by examiner

METHOD AND APPARATUS FOR SELECTING A SIGNAL SOURCE

BACKGROUND

Many televisions (TVs) today have multiple audio/video (A/V) inputs which can be used to connect a variety of A/V sources (e.g. a DVD player, VCR player etc.) to the TV at one time. An inconvenience of some of these TVs is that a user must manually select the desired AV input. In order to address this issue, some systems detect video either directly or indirectly through side effects of that video signal (e.g. electromagnetic noise). A video test pattern may be used. Direct video detection is complicated and may not work for all TVs. Methods that alter the video signal can be unpleasant to the viewer. Indirect video detection may not work across all current and future TV types, and interference from other devices (e.g. microwave ovens) can impact reliability.

SUMMARY

According to a first aspect of the invention, a method of selecting a signal input includes the steps of transmitting an audio signal to an audio input of a device that includes a plurality of audio inputs. A setting of the device is automatically advanced from a currently set audio input to another one of the audio inputs when the device does not output a signal associated with said audio signal.

The method can include that (a) the device is a television, (b) a video signal is also transmitted to the device, (c) the transmitted audio signal includes a sine wave, or (d) the transmitted audio signal includes sine waves at two different frequencies. The sine waves can be in series. The audio signal can include sine waves at three different frequencies. Each audio input can have an associated video input. The transmitting step can be accomplished over an electrical conductor. The transmitted audio signal can be a known audio signal.

Further features include that the audio output of the device includes a speaker which produces acoustic waves when the signal associated with the audio signal is output by the device. A microphone can be used to detect the acoustic waves. The advancing step can utilize a wireless transmitter to cause the device to advance the setting from a current audio input to a next one of the audio inputs. The transmitting and advancing steps can be repeated until said signal associated with said audio signal is output by the audio output of the device.

According to another aspect of the invention, an apparatus for selecting a signal input includes an audio source device for producing an audio signal. An audio reproduction device receives the audio signal on one of a plurality of audio inputs. When a signal associated with the audio signal is not output by the audio reproduction device, an audio input setting of the audio reproduction device is automatically advanced from a current audio input to another audio input.

Additional features include that (a) the audio reproduction device is a television, (b) a video signal is also transmitted to the audio output device, (c) the produced audio signal includes a sine wave, (c) each audio input has an associated video input, (d) the produced audio signal is a known audio signal, (e) the audio output device includes a speaker which produces acoustic waves when an audio signal is output by the device, and (f) the signal associated with the audio signal is substantially the same as the audio signal.

A further feature includes that automatically advancing the audio input setting is accomplished by the audio source device issuing a command to the audio reproduction device over a hard wired connection between the audio source device and the audio reproduction device.

DETAILED DESCRIPTION

Described below is a system which automatically selects the correct A/V signal input from a plurality of A/V inputs which are provided on a TV. This arrangement prevents a viewer of the TV from having to manually scroll through the A/V inputs in order to select the correct input.

Figure 1:
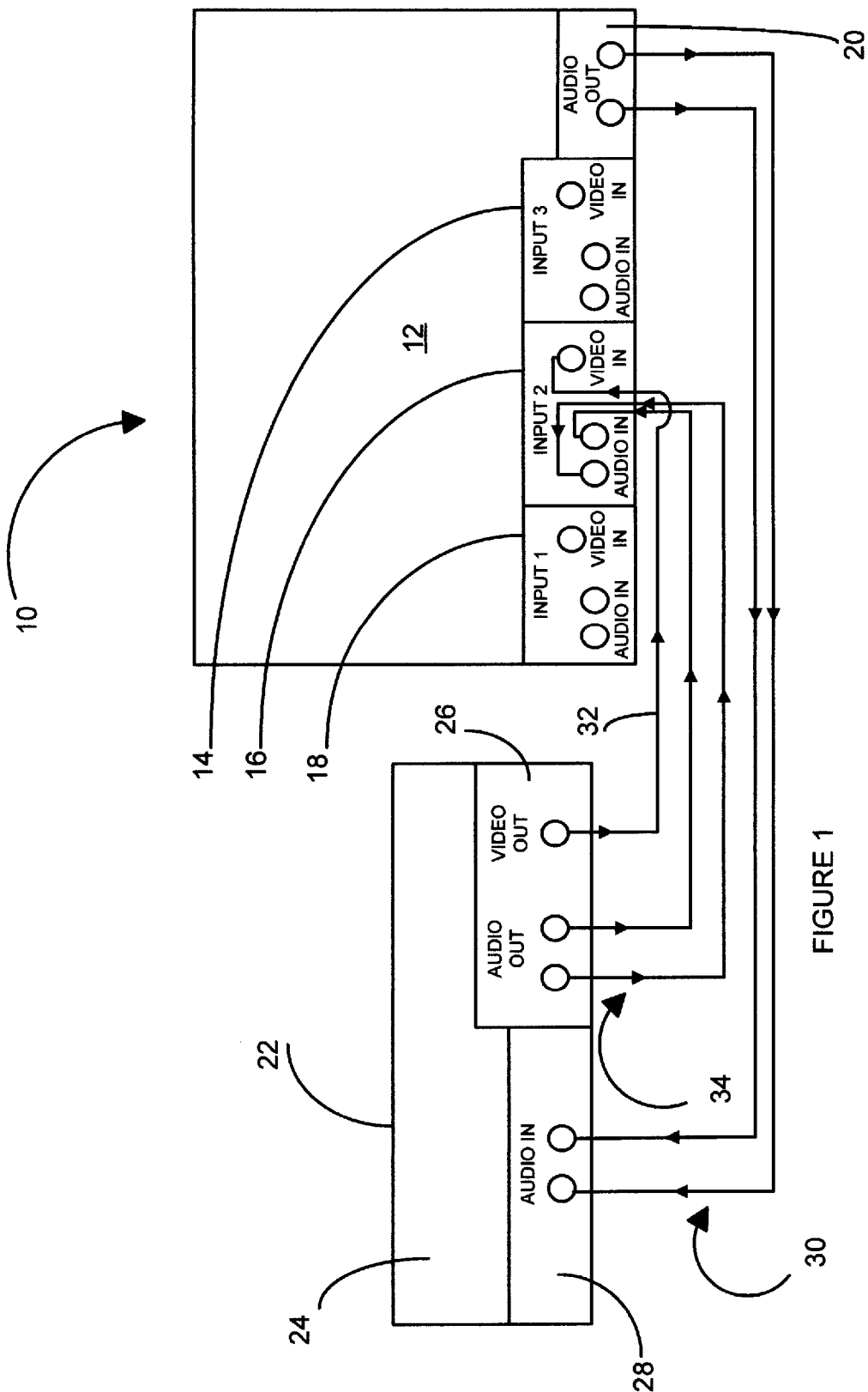
FIG. 1 is schematic diagram of a back view of an A/V source and a TV.

With reference to FIG. 1, a TV 10 includes a back panel 12. Located on a lower portion of the panel 12 are A/V inputs 14, 16 and 18. Each of these A/V inputs includes left and right audio in jacks as well as a composite video in jack. Also located on a lower portion of the panel 12 is an audio out portion 20 with left and right audio out jacks. The TV 10 may include other types of A/V inputs and outputs (not shown) such as for component video, S-video, HDMI, coaxial cable etc.

A digital video disk (DVD) player 22 includes a back panel 24 which has a first portion 26 with left and right audio out jacks as well as a composite video out jack. Also located on a lower portion of the panel 24 is an audio in portion 28 with left and right audio in jacks. The left and right jacks of audio in portion 28 are electrically connected with the audio out jacks in portion 20 of TV 10 by electrical cables 30. The video out jack of DVD player 22 is electrically connected with the video in jack in "INPUT 2" of TV 10 by electrical cable 32. The left and right audio out jacks in portion 26 are electrically connected with the audio in jacks in "INPUT 2" of TV 10 by electrical cables 34. It should be noted that other A/V sources (not shown), such as a VCR and a camcorder, might be connected to "INPUT 1" and "INPUT 3" of TV 10.

A description of the operation of this system will now be described. When a person wants to watch a DVD they turn on the power to the DVD player 22 and the TV 10. As an option to requiring the person to manually turn on the power to the TV, the DVD player may include an automatic TV turn-on feature as described in U.S. patent application Ser. No. 10/863,930 (published on Jan. 12, 2006 as US-2006-0007221-A1), the disclosure of which is incorporated herein by reference thereto. In the '930 application, when a video source device (e.g. a DVD player) that is connected to a TV is powered on, a sensor determines whether or not the TV is currently powered on. If the TV is not powered on, the video source device emits a signal that automatically causes the TV to turn on. This feature has been implemented in the Bose® Lifestyle® 38 DVD home theater system by incorporating the infrared (IR) codes (including the on/off codes) for a large number of TV types into the media center of the Lifestyle® 38 system. When the user sets up the system, they select the appropriate TV in a menu of the Lifestyle® 38 system. An IR transmitter in the Lifestyle® 38 system uses the correct IR on/off code for the selected TV to automatically turn the TV on or off as discussed above.

Figure 2:
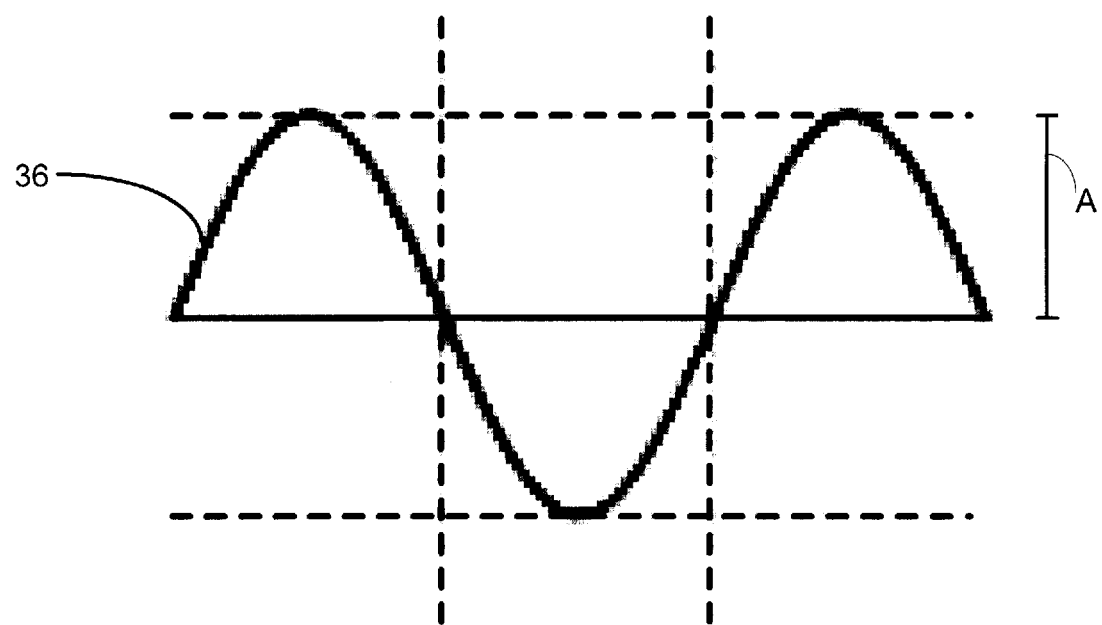
FIG. 2 is an audio signal that can be transmitted from the AV source to the TV.

Once the DVD player 22 and the TV 10 are powered on, the DVD player transmits a known test audio signal out of one or both of its audio out jacks. This test signal may be in the form of a sine wave 36 shown in FIG. 2. The sine wave 36 has a known amplitude A and a known frequency. Rather than using a constant sine wave, the signal may include a first sine wave having a known amplitude and frequency that lasts for a first period of time, followed by a second sine wave having a different amplitude and/or frequency that lasts for a second period of time different from the first period of time. The audio signal includes the first sine wave for the first period of time, followed by the second sine wave for the second period of time followed by the first sine wave and so forth. Third, fourth, etc. sine waves may be used that are all different from each other. Using more than one type of sine wave helps to distinguish the audio signal from other audio signals, as will be discussed in further detail below. Of course other types of audio signals (e.g. in the form of a square wave) can be used besides sine waves. The test audio signal frequency is above the upper frequency limit of human hearing (e.g. above 20 kHz) so that people in the vicinity of the TV 10 cannot hear the test audio signal being played by the TV's speakers when the TV is set to the correct A/V "INPUT 2". Alternatively, the test audio signal frequency can be in the frequency range of human hearing (e.g. 20 Hz-20 kHz) so that a nearby person can detect the test is proceeding.

The audio signal is transmitted over preferably one (or both) of electrically conductive cables 34 to preferably one (or both) of the audio input jacks of "INPUT 2". The DVD player 22 attempts to detect on one (or both) of its audio input jacks a signal associated with the test audio signal that it transmitted out of its audio out jack(s). The signal associated with the test audio signal is preferably substantially the same as the test audio signal. The DVD player 22 is looking for an input audio signal that matches the characteristics of the test audio signal that it output. If the DVD player detects this test audio signal on its audio in jack(s), then that means TV 10 is currently set to "INPUT 2". As such, the DVD player 22 can commence transmitting A/V data from a loaded DVD out of A/V out jacks in portion 26 to TV 10. This A/V data will be performed by TV 10 because the TV is set to the correct input.

If, however, TV 10 had instead been set to "INPUT 3" instead of "INPUT 2" in the description of the previous paragraph, the test audio signal received at the audio in jack(s) of "INPUT 2" would not be transmitted out of audio out jack(s) in portion 20 of the TV 10. If the DVD player 22 does not detect the test signal on its audio in jack(s) after a set period of time, the DVD player causes the TV 10 to automatically advance the TV's setting from a currently set A/V input ("INPUT 3") to another one of the A/V inputs (in this case "INPUT 1") in a manner similar to the discussion above of the Lifestyles 38 system. That is, the IR code sets for a large number of TV types are stored in the DVD player 22. The user has previously selected on the DVD player the correct code set for their TV 10. The DVD player 22 automatically transmits the appropriate IR code (e.g. the code for Input 1) from an IR transmitter (not shown) on the DVD player to an IR receiver (not shown) on the TV 10 which causes the TV 10 to advance to Input 1.

Now the TV 10 is set at its "INPUT 1" setting, and the process automatically repeats as discussed in the three previous paragraphs. This will cause the TV 10 to automatically advance to A/V "INPUT 2". Now when the cycle repeats, the DVD player 22 will detect the test audio signal on its audio in jack(s). As such, the cycle will stop because the TV 10 is now set on the correct A/V "INPUT 2". It should be noted that each time the DVD player 22 emits an IR input code, it saves that code in a specific non-volatile memory block. In the example described above in this paragraph and the previous paragraph, first the "INPUT 1" code would be saved in this memory block, and then "INPUT 1" would be replaced by "INPUT 2" when the "INPUT 2" IR code is emitted by the DVD player. The next time the DVD player 22 is used, the DVD player will first check the non-volatile memory and then emit the "INPUT 2" IR code. After this, the DVD player 22 will emit its test signal which should be received back by the DVD player as discussed above unless someone has moved the cables 34 from "INPUT 2". It should be noted that for typical TVs, changes to the TV's volume and mute settings will not affect the signal transmitted out of the TV's audio out jacks. If there is a TV where volume and mute changes on the TV affect the signal output by the TV's audio out jacks, the discussion below related to automatically changing the volume and un-muting the TV can be applied to the example discussed above.

Figure 3:
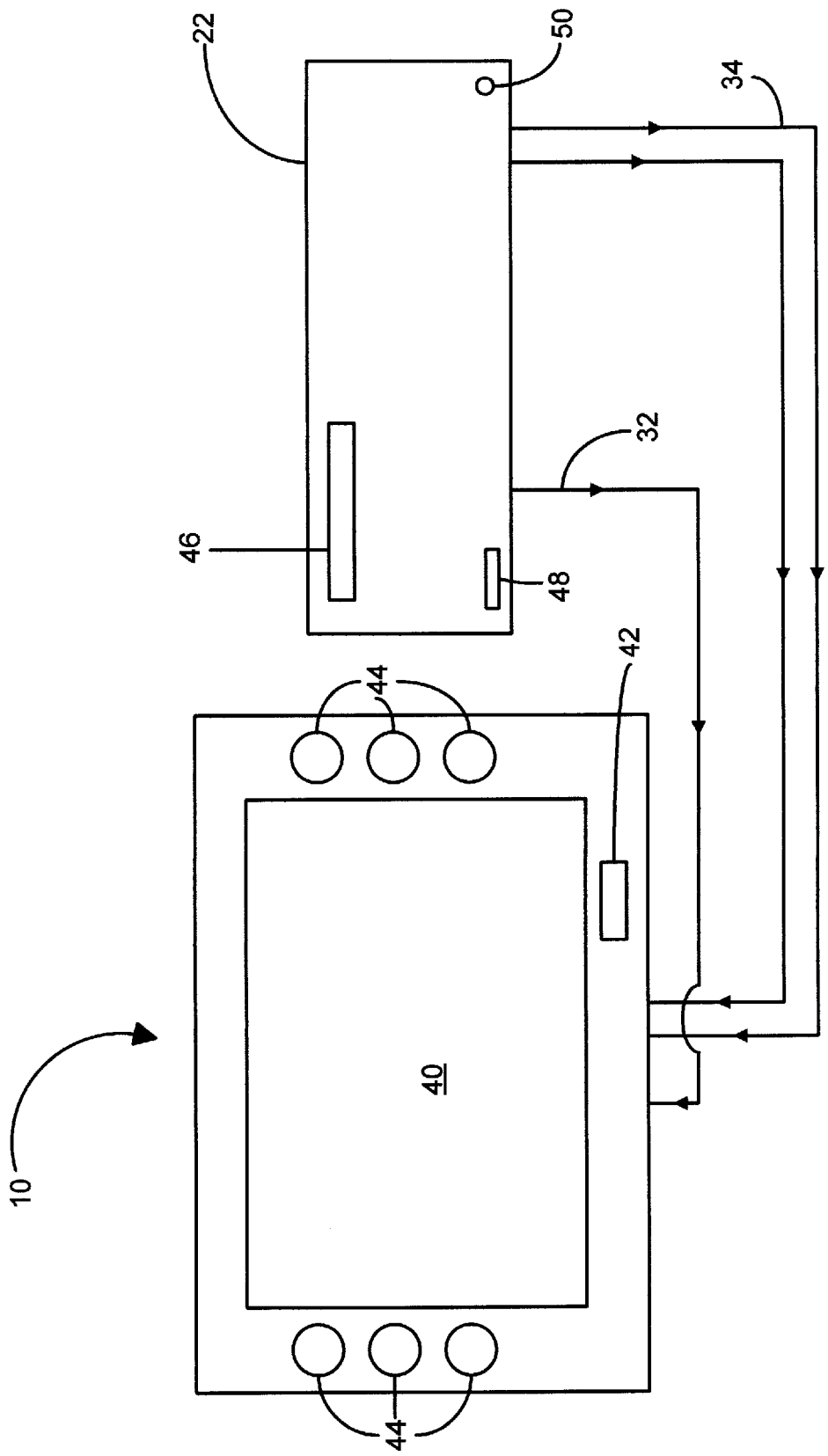
FIG. 3 is a schematic diagram of a front view of an A/V source and TV.

Turning to FIG. 3, another example will be described. Similar reference numbers will be used as in the example described above for similar components. The TV 10 includes an image display area 40 and an IR receiver 42 (mentioned above). A plurality of speakers 44 are located on both sides of the image area 40. The DVD player 22 includes a drawer 46 that moves between an open position (to receive or remove a DVD) and a closed position. The player also includes an IR transmitter 48 (mentioned above). This example differs from the example of FIG. 1 in that cables 30 have been eliminated. Instead, a microphone 50 has been added to the DVD player 22.

On initial set-up of the DVD player 22 with the TV 10, the user selects the type of TV that is being connected to the DVD player (discussed above). The DVD player stores the selected TV information. A display on the DVD player then instructs the user to un-mute the TV and press enter when they have done so. The DVD player then automatically emits IR codes to first turn down the volume on the TV 100 times (effectively turning the volume off) and then turn the volume up 10 times. The test audio signal cycle as described above is conducted. If the cycle runs through all of the A/V inputs on the TV without the microphone 50 detecting the signal associated with the audio signal, the DVD player 22 automatically emits IR codes to turn the volume up 10 more times. When the volume is turned up loud enough and the TV 10 is set to the correct A/V input, an audio signal associated with the test audio signal will be reproduced by one or more of the speakers 44. When the microphone 50 hears the signal associated with the test signal, the correct A/V input is set and the cycle ends. The correct A/V input and volume level setting are stored in non-volatile memory of the DVD player 22.

Figure 4:
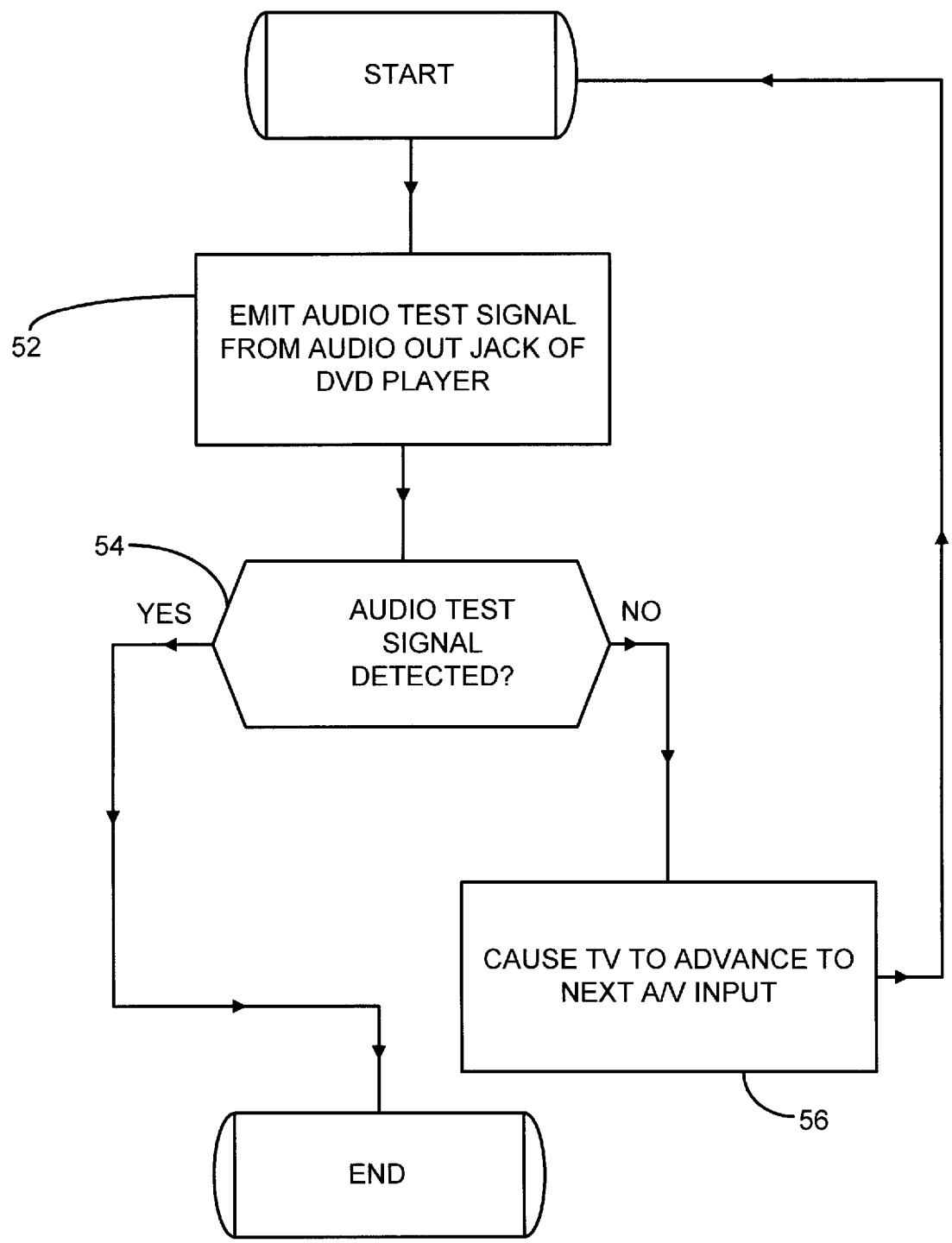
FIG. 4 is a logic flow diagram.

When the DVD player 22 is used subsequent to the initial setup, the DVD player automatically emits an IR code to set the TV 10 to the A/V input stored in the non-volatile memory of the DVD player. The test audio signal is then emitted by the DVD player. In most cases the DVD player 22 will still be connected to the same A/V input, the TV will be un-muted, and the volume on the TV will be at a reasonable level, so the signal associated with the test audio signal will be detected by the microphone 50. If the signal associated with the test audio signal is not detected by the microphone 50, the DVD player 22 presents a message on its display instructing the user to un-mute the TV 10. The test audio signal is then transmitted again. If the signal associated with the test audio signal is not detected by the microphone 50, the DVD player 22 emits IR codes to turn the volume down 100 times and then turn the volume up to the level that was previously stored in non-volatile memory of the DVD player 22. The test audio signal is again transmitted. If the signal associated with the test audio signal is not detected now, it means that the DVD player 22 is connected to a different A/V input of the TV 10 than the A/V input that was stored in the non-volatile memory of the DVD player 22. Now the DVD player 22 starts the test cycle, working its way through the various A/V inputs of the TV until the signal associated with the test audio signal is detected by the microphone. One skilled in the art will recognize that the order in which, for example, volume changes, mute changes, and cycling through the A/V inputs are accomplished can be changed from that described above FIG. 4 shows a hi-level flow diagram of a basic sub-routine that is engaged when the DVD player is powered up. At a box 52 the test audio signal is emitted for a set period of time. At a decision box 54 it is determined whether or not the test audio signal has been detected. In the first example above the test signal will be looked for on the audio in jack(s) of the DVD player 22. In the second example above the test signal will be looked for at the microphone of the DVD player 22. If the test audio signal is not detected, the logic proceeds to a box 56 where the DVD player 22 is caused to emit an IR signal which advances the TV to the next A/V input. The logic then returns to box 52 and the cycle repeats until the audio test signal is detected at the box 54. At this point the sub-routine ends.

While the invention has been particularly shown and described with reference to specific exemplary embodiments, it is evident that those skilled in the art may now make numerous modifications of, departures from and uses of the specific apparatus and techniques herein disclosed. For example, the DVD player 22 may instead be an A/V receiver or an A/V switch to which a DVD player or other source device is connected. Additionally, the TV may instead be a separate audio or audio/video switchbox with the feature of two or more inputs. The correct input is determined by detecting audio emitted by the device through an audio out channel or a speaker. One other point is that although the commands from the DVD player 22 to the TV 10 are described as being wirelessly sent by an IR transmitter, these commands could be sent over a wired connection (e.g. over an HDMI cable). Consequently, the invention is to be construed as embracing each and every novel feature and novel combination of features presented in or possessed by the apparatus and techniques herein disclosed and limited only by the spirit and scope of the appended claims.

What is claimed is:

1. A method of selecting a signal input, comprising the steps of:
    transmitting a known audio signal from a first audio/visual device to a first audio input of a television that includes a plurality of separate audio inputs, where the television is adapted to receive an audio input that is to be played over a loudspeaker of the television; then
    receiving by the first audio/visual device an output signal from an audio output of the television; and then
    attempting by the first audio/visual device to detect the presence of the known audio signal in the output signal from the television; and then
    automatically changing an audio input setting of the television from the first audio input to a second audio input, when the presence of said known audio signal is not detected in the output signal from the television.

2. The method of claim 1, wherein a video signal is also transmitted to the television.

3. The method of claim 1, wherein the transmitted known audio signal includes a sine wave.

4. The method of claim 1, wherein the transmitted known audio signal includes sine waves at two different frequencies.

5. The method of claim 4, wherein the sine waves are transmitted in series.

6. The method of claim 1, wherein the transmitted known audio signal includes sine waves at three different frequencies.

7. The method of claim 1, wherein each audio input of the television has an associated video input.

8. The method of claim 1, wherein the transmitting step is accomplished over an electrical conductor.

9. The method of claim 1, wherein the television includes a speaker which produces acoustic waves when the transmitted known audio signal received by the television is in the output signal of the television.

10. The method of claim 9, wherein a microphone incorporated into the audio/visual source device is used to detect the acoustic waves.

11. The method of claim 1, wherein the transmitting and changing steps are repeated until said known audio signal is present within the output signal of the television.

12. The method of claim 1 wherein the first audio/visual device controls the automatic changing of the audio input setting of the television.

* * * * *